(12) United States Patent
Cuellar et al.

(10) Patent No.: US 7,044,727 B2
(45) Date of Patent: May 16, 2006

(54) SHEETING APPARATUS HAVING NON-CONTACTING ROLLER END

(75) Inventors: Tony Cuellar, McKinney, TX (US); Paul Hartman, Whittier, CA (US); Edward Leon Ouellette, Denton, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 10/930,274

(22) Filed: Aug. 31, 2004

(65) Prior Publication Data

US 2006/0045932 A1    Mar. 2, 2006

(51) Int. Cl.
*A21C 3/02* (2006.01)

(52) U.S. Cl. .................... 425/363; 425/367

(58) Field of Classification Search .......... 425/363, 425/367
See application file for complete search history.

(56) References Cited

U.S. PATENT DOCUMENTS

| | | | | |
|---|---|---|---|---|
| 2,179,961 A | * | 11/1939 | Schnuck | 425/367 |
| 2,513,541 A | * | 7/1950 | Winegar et al. | 425/367 |
| 2,784,683 A | * | 3/1957 | Curtis et al. | 425/363 |
| 2,814,260 A | * | 11/1957 | Morgan | 425/367 |
| 2,960,044 A | * | 11/1960 | Anetsberger | 425/367 |
| 2,998,623 A | * | 9/1961 | Lawson et al. | 425/363 |
| 3,017,665 A | * | 1/1962 | Dasher et al. | 425/367 |
| 3,570,054 A | * | 3/1971 | Seanor et al. | 425/367 |
| 3,748,073 A | * | 7/1973 | Lankford et al. | 425/367 |
| 3,985,488 A | * | 10/1976 | Hoffmann | 425/363 |
| 4,043,731 A | * | 8/1977 | Kratzmann et al. | 425/366 |
| 5,558,885 A | * | 9/1996 | Herrera | 425/363 |
| 5,970,270 A | | 10/1999 | De Roeck | |
| 6,287,427 B1 | | 9/2001 | Beck | |
| 6,692,008 B1 | | 2/2004 | Beck | |

FOREIGN PATENT DOCUMENTS

| | | | |
|---|---|---|---|
| DE | 26 15 585 | * | 10/1977 |
| EP | 0795915 A2 | | 9/1997 |
| WO | WO 88/01135 | * | 2/1988 |

* cited by examiner

*Primary Examiner*—James P. Mackey
(74) *Attorney, Agent, or Firm*—Collin P. Cahoon; Carstens & Cahoon, LLP

(57) ABSTRACT

An improved end seal for a sheeting apparatus. A sealing material is formed into a more effective sealing element which locks out doughy material out of associated side sealing parts near the sheeting nip. Such an improved end seal provides improved wiping and sealing functions. Such a seal also reduces wear thus reducing the frequency of seal replacement. Such a seal reduces the amount of installation time and amount of error associated with manual adjustment ordinarily required to replace end seals.

8 Claims, 3 Drawing Sheets

SHEETING APPARATUS HAVING NON-CONTACTING ROLLER END

BACKGROUND

1. Technical Field

The present invention relates to an improved apparatus to seal the sides of the nip area at the sides of opposing sheeter rollers generally mounted parallel to each other. An improved seal prevents doughy material from penetrating into crevices of the apparatus according to the prior art as doughy material is compressed into a sheet. Specifically, this invention uses improved materials and configurations to create a new side seal for a sheeting apparatus.

2. Description of Related Art

With reference to FIG. 1, in a conventional dough sheeter, opposing rollers 110 are separated by a small gap or nip 102. Doughy material 104 is fed into the nip 102 above opposing rollers 110 and passes through the nip 102 to form a sheet 106. It is normally necessary to place a seal at the ends of opposing sheeter rollers to prevent leakage of doughy material from the sides of opposing rollers 110. Leakage results in loss of valuable product as well as thinning of the dough sheet near the edges.

FIG. 2 shows an overhead view of conventional side seals. With reference to FIG. 2, side seals 210 are typically made of a plastic or other low-friction material, and are pressed against the ends of sheeting rollers 110 by mechanical means including, but not limited to, screws 204 attached to a sheeter housing 206. Such side seals 210 press with a force greater than the pressure created by the sheeting process. There are several drawbacks to conventional arrangements including seal leakage, seal wear due to pressurized contact, and poor accessibility for seal replacement.

FIG. 3a is a cross-sectional drawing of a portion of a prior art side seal. Such a side seal according to the prior art consists of a side seal bracket 320 of arbitrary shape made of metal or other stiff material, a shim 312 also made of a metal or other stiff material, and a plastic sealing piece 308. FIG. 3a shows such a portion of a side seal after newly assembled and before operation of a sheeting apparatus. The shim 312 is held in place by one or more screws 314.

Often, manual adjustment of the side seal is required to obtain the desired distance between the plastic sealing piece 308 and the sheeting rollers 512, 514. Generally, the shims 312 and screws 314 must be manually adjusted to bring the sealing pieces 308 within about 0.05 inches (1.27 mm) to 0.07 inches (1.78 mm) of the side surface of the sheeting rollers 512, 514 along the length of the sealing piece 308. According to some embodiments of the prior art, such adjustment may require up to twelve hours of manual adjustment each time the seals are replaced. According to the prior art, side seals wear out within about one month of continuous sheeting operation.

With reference to FIG. 3a, when the side seal is assembled, the shim 312 and plastic sealing piece 308 are tightly abutted to each other, and the plastic sealing piece 308 is uniform having no wear. FIG. 3b is a similar cross-sectional drawing showing the same pieces of a side seal after having been subjected to approximately one month of continuous operation and wear. Over time, doughy material 104 is forced into the interface between the plastic sealing piece 308 and the metal shim 312 by the operating or sheeting pressure generated by opposing sheeting rollers 512, 514. As seen in FIG. 3b, repeated penetration of doughy material 104 between the sealing piece 308 and the metal shim 312 has forced the plastic sealing piece 308 to bulge outward toward the sheeting rollers 110. This has caused the plastic sealing piece 308 to wear away and to be replaced by doughy material 104 although still maintaining a relatively flat outer surface 402. Over time, the thickness of the plastic sealing piece 308 remains thicker near the attaching screw 310. If the plastic sealing piece 308 is not replaced, the side seal eventually becomes ineffective.

Consequently, a need exists for an improved apparatus to provide for more effective sealing of the sides of a dough sheeter and less waste of doughy material. A need exists to eliminate the required manual adjustment necessary to replace plastic sealing pieces. A need exists for an apparatus that allows for easier, faster installation of replacement side sealing pieces. A further need exists to eliminate plastic sealing material from entering sheeted dough as the plastic sealing piece is worn away during sheeting operation. Additionally, a need exists to reduce the frequency of replacing worn plastic sealing pieces.

SUMMARY OF THE INVENTION

The proposed invention comprises an improved end seal for a sheeting apparatus. A sealing material is formed into a more effective surface to prevent doughy material from leaving the sheeting nip. In one embodiment, an improved end seal provides an improved wiping and sealing function. Such an improved seal also reduces wear by preventing doughy material from being forced into the seal assembly, thus reducing the frequency of seal replacement. Such an improved seal reduces the amount of installation time and amount of error associated with manual adjustment ordinarily required to replace end seals. Additional features and benefits of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

Figure 1:
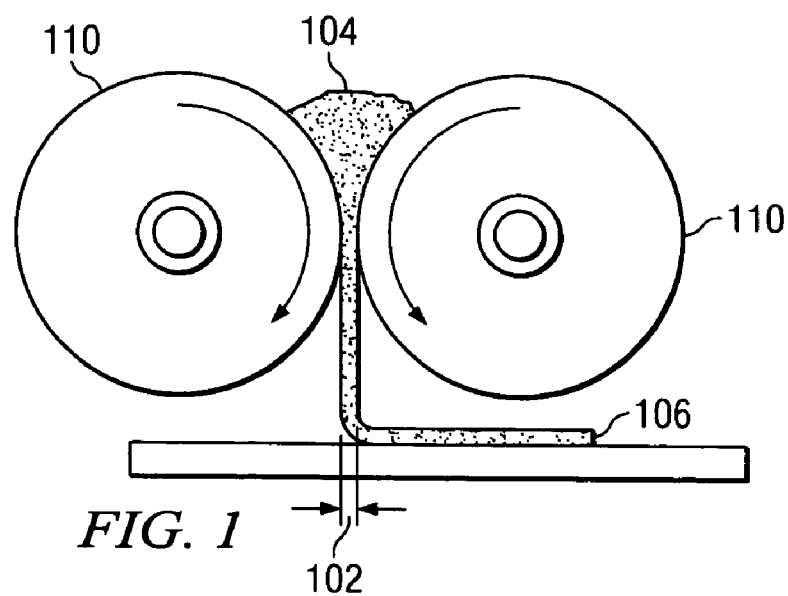
FIG. 1 is a drawing showing a cross-sectional side view of a pair of opposing sheeting rollers.
Figure 2:
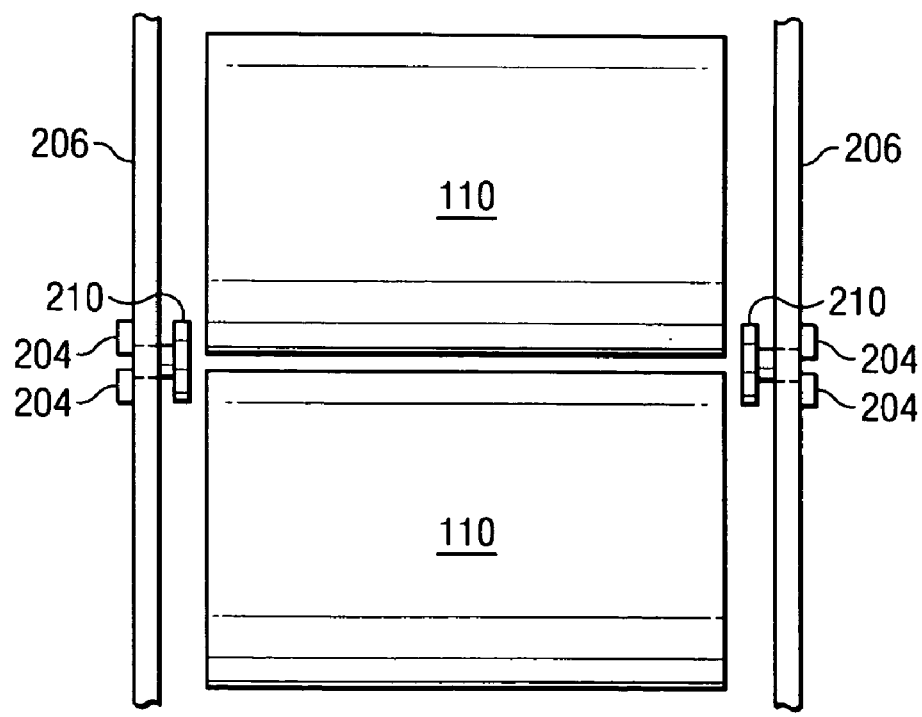
FIG. 2 is a drawing showing an overhead cross-sectional view of a sheeting apparatus according to the prior art wherein side seals are mounted to the sheeter housing.
Figure 3A:
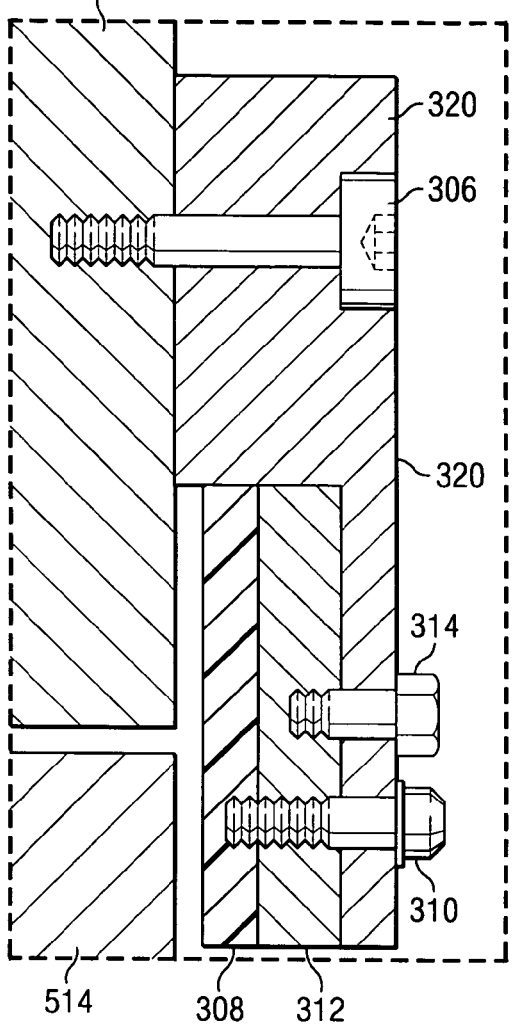
FIG. 3a is a drawing of a cross-sectional view of a portion of a freshly installed side seal.
Figure 3B:
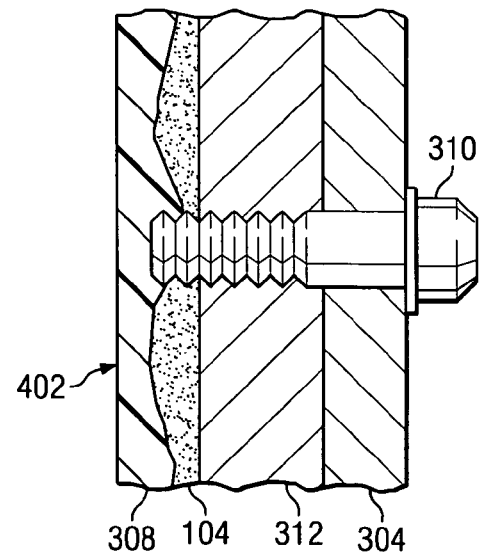
FIG. 3b illustrates a typical side seal after substantial wear and approximately one month of continuous operation.
Figure 4:
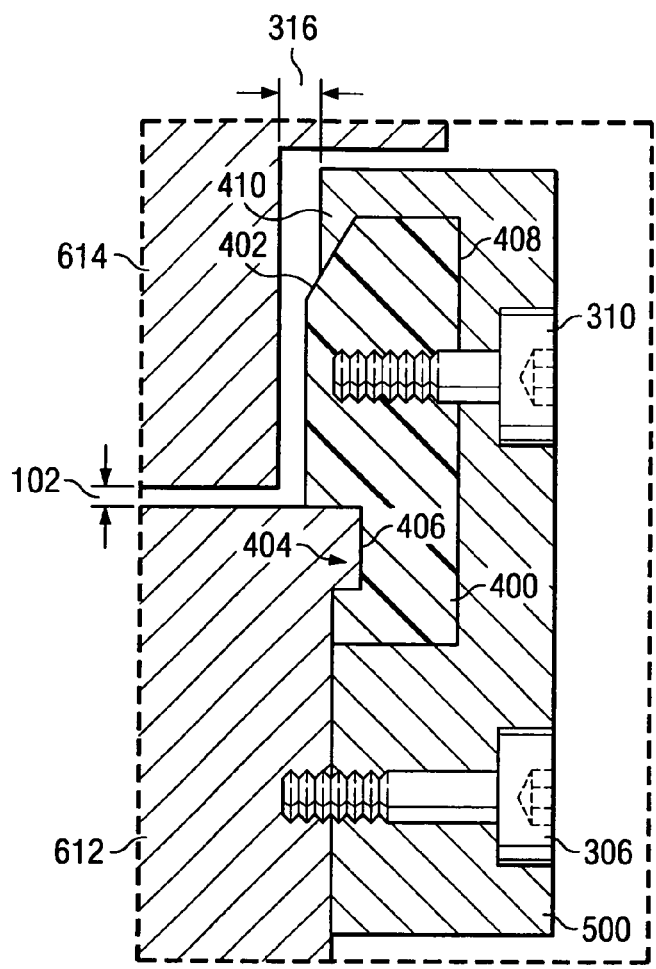
FIG. 4 is a partial cross-sectional view of a preferred embodiment of a roller-mounted side seal according to the present invention.

REFERENCE NUMERALS 102 nip
104 doughy material
106 dough sheet 110 opposing sheeting rollers
204 screws
206 sheeter housing
210 side seals
306 bracket mounting screw
308 plastic sealing piece
310 seal attaching screw
312 shim
314 set screw
316 seal distance
320 side seal bracket
402 flat outer surface in FIG. 3b, mating contour in FIG. 4
400 sealing element
402 mating contour
404 roller lip
406 groove
408 back surface
410 bracket lip
512 first sheeting roller according to a prior art apparatus
514 opposing sheeting roller according to a prior art apparatus
500 improved sealing bracket
502 seal mounting hole
504 bracket mounting hole
612 first sheeting roller
614 opposing sheeting roller

DETAILED DESCRIPTION

While the invention is described below with respect to a preferred embodiment, other embodiments are possible. The concepts disclosed herein apply to other systems for producing sheeted products.

The primary objective of this invention is to provide an apparatus which provides improved sealing of the sides of the nip area of a dough sheeting apparatus. In one embodiment, a side seal is made such that after it is mounted in place, the side seal lightly or nearly contacts the side edge of the sheeting rollers. In such an embodiment, no shim 312 is required. One or more shims, however, may be used, depending on the specific application. One or more plastic sealing pieces are attached to a bracket by screws or other mechanical means. Such a side seal is mounted to a housing or other member adjacent to the nip region of the sheeting rollers.

Figure 5:
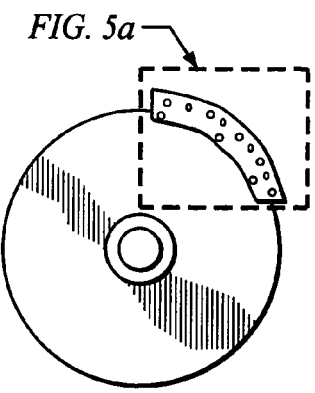
FIG. 5 is a drawing of one roller and one section of a roller-mounted side seal according to the present invention as seen from the side of a sheeting apparatus.
Figure 5A:
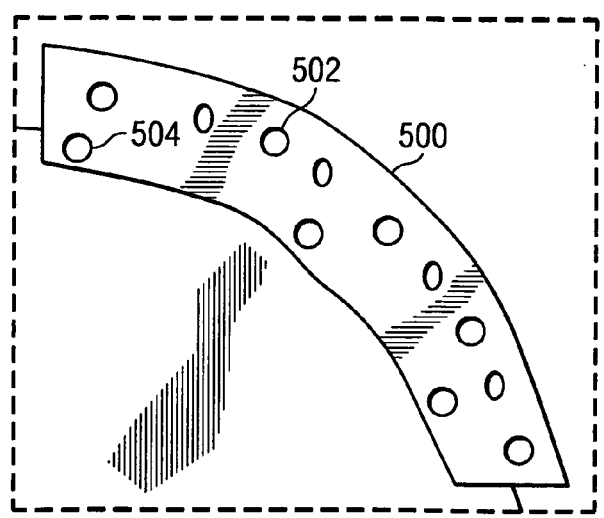
FIG. 5a is a drawing showing a close-up view of a bracket used to mount a side seal on the roller shown in FIG. 5.

With reference to FIG. 4, according to a preferred embodiment of the invention, side seals are mounted on the sides of a first sheeting roller 612, across the sheeter nip 102, and overlap an opposing sheeting roller 614. With reference to FIG. 4, FIG. 5, and FIG. 5a, a sealing element 400 is attached with attaching screws 310 through seal mounting holes 502 to an improved sealing bracket 500. An improved sealing bracket 500 has a bracket lip 410 on the edge of a sealing bracket 500 which tightly holds a sealing element 400 in place. In one embodiment, a sealing element 400 is formed with a mating contour 402 that coordinates with a bracket lip 410 along the edge of a sealing bracket 500, which contributes to maintaining tightly in place the sealing element 400. A bracket lip 410 on an improved sealing bracket 500 holds a sealing element 400 along the entire circumference of a sheeter roller and is not held solely by mounting screws 310. Such an arrangement of pieces reduces wear to a seal element 400 by reducing the possibility that dough is forced into the seal assembly such that replacement of a seal element 400 is only necessary about every few years instead of about once per month. In another embodiment, screws 310 are not used to attach a sealing element 400 because of the presence of a bracket lip 410 of an improved sealing bracket 500.

In another embodiment, an improved sealing bracket 500 or sealing element 400 is formed such that there is no need for a shim 312 along the back surface 408 of the sealing element 400. Such sealing element 400 eliminates a necessity in the prior art to manually adjust the distance 316 between a sealing piece 308 and the side surface of an opposing sheeting roller 614 by the addition of one or more shims 312. With fewer pieces, replacement of side seals takes less time translating into more time of actual sheeter operation. In one embodiment, replacement of side seals takes about two hours.

In another embodiment, a sealing element 400 is formed such that when the sealing element 400 and the improved sealing bracket 500 are installed, the distance 316 between the sealing element 400 and the side of an opposing roller 614 is from about 0.05 inches (1.27 mm) to 0.07 inches (1.78 mm). As a reference, the size of the sheeter nip 102 during operation is typically in the range from about 0.008 inches (0.20 mm) to 0.012 inches (0.30 mm). Other sizes of sheeter nip 102 are possible, and other distances between the sealing element 400 and the side of an opposing roller 614 are possible.

In one embodiment, a sealing element 400 is made of an elastomeric material. Alternatively, a sealing element is made of acetal copolymers such as DELRIN® polymer, or polytetrafluoroethylene (PTFE) known commercially as TEFLON® (both available from E. I. DuPont Co., Wilmington, Del.). In another embodiment, a sealing element is made of ultra high molecular weight polyethylene (UHMWP). UHMWP has long molecular chains, is durable and versatile, and is used in many industries. UHMWP, DELRIN® polymer, PTFE, and elastomeric materials have desirable attributes such as a high abrasion resistance, a low coefficient of friction, and unparalleled impact resistance.

In one embodiment, a sealing element 400 is formed such that it fits in an improved sealing bracket 500 and fits tightly against the most proximal portion of a side surface of a first sheeting roller 612. The side surface may form part of a roller lip 404. A sealing element 400 is preferably formed with a groove 406 such that the sealing element 400 is held tightly around a roller lip 404 of the first sheeting roller 612. This improvement avoids gaps and crevices between a plastic sealing piece 308, any shims 312, and a first sheeting roller 612. Such improvement prevents doughy material 104 from being forced into such areas while the doughy material 104 is under operating sheeting pressure.

In one embodiment, a sealing element 400 is pressed firmly against the side of a first sheeting roller 612 by a screw 306. In other embodiments of the invention, other types of fasteners may be used. Doughy material under sheeting pressure is thereby further prevented from infiltrating crevices between attached parts. With such improved features, a sealing element 400 more effectively performs wiping and sealing functions along the sides of an opposing sheeting roller 614 during the operation of the sheeting apparatus.

With reference to FIG. 5 and FIG. 5a, side seals are mounted piecewise around the circumference of a first sheeting roller 612. In one embodiment, twelve pieces or sealing brackets 500 are used to apply a complete side seal which covers the entire circumference of one side of a sheeting roller 612. A side seal can be joined to each side of the first sheeting roller 612, and thus the sheeter nip 102 can be sealed on both sides. In FIG. 5a, each improved side seal bracket 500 is attached to a first sheeting roller 612 by screws (not shown) placed in bracket mounting holes 504 along one side of an improved side seal bracket 500.

While the invention has been particularly shown and described with reference to a preferred embodiment, it will be understood by those skilled in the art that various changes in form and detail may be made therein without departing from the spirit and scope of the invention.

We claim:

1. A side seal for a nip area of a sheeting apparatus comprising:
    a first sheeting roller;
    an opposing sheeting roller located substantially parallel and approximate to said first sheeting roller creating a sheeting nip therebetween;
    at least one side seal bracket having a retaining lip shaped to mate with a side sealing element wherein the side sealing element is held in position adjacent said sheeting nip by the retaining lip of the side seal bracket, further wherein the side seal bracket is attached to said first sheeting roller.

2. The apparatus of claim 1 wherein said sealing element is additionally attached to said seal bracket by at least one screw.

3. The apparatus of claim 1 wherein said sealing element is made of an elastomeric material.

4. The apparatus of claim 1 wherein said sealing element is substantially comprised of an acetal copolymer.

5. The apparatus of claim 1 wherein said sealing element is substantially comprised of PTFE.

6. The apparatus of claim 1 wherein said sealing element is made of ultra high molecular weight polyethylene.

7. The apparatus of claim 1 wherein said sealing element forms a continuous seal along a circumference of said first sheeting roller.

8. The apparatus of claim 1 wherein said sealing element is continuously supported along a length of said seal bracket.

* * * * *